United States Patent [19]

Spence

[11] 3,744,037

[45] July 3, 1973

[54] TWO-CLOCK MEMORY CELL

[75] Inventor: John R. Spence, Villa Park, Calif.

[73] Assignee: North American Rockwell Corporation, El Segundo, Calif.

[22] Filed: Oct. 4, 1971

[21] Appl. No.: 186,361

[52] U.S. Cl. .............................. 340/173 CA, 307/238

[51] Int. Cl. .......................... G11c 11/24, G11c 11/40

[58] Field of Search ................. 340/173 R, 173 CA; 307/238

[56] References Cited

UNITED STATES PATENTS

| | | | |
|---|---|---|---|
| 3,581,292 | 5/1971 | Polkinghorn | 340/173 R |
| 3,582,909 | 6/1971 | Booker | 340/173 R |
| 3,591,836 | 7/1971 | Booker et al. | 340/173 R |

*Primary Examiner*—Stanley M. Urynowicz, Jr.
*Attorney*—L. Lee Humphries, Robert G. Royers et al.

[57] ABSTRACT

A memory cell has read, write, and address field effect transistors.

The address field effect transistor is controlled by one clock signal including an address interval ANDed with ORed read and write intervals. Data is stored in the cell by a capacitive storage device having an electrode connected to a second clock signal which includes a reset interval and a read interval. The second clock provides a boost signal for enabling a relatively high voltage level to be read-out during the read interval where the stored data is a logic one. A fixed voltage level is connected to write and read field effect transistors in the cell.

26 Claims, 3 Drawing Figures

INVENTOR
JOHN R. SPENCE
BY Robert G. Rogers
ATTORNEY

INVENTOR
JOHN R. SPENCE
BY Robert G. Rogers
ATTORNEY

TWO-CLOCK MEMORY CELL

BACKGROUND OF THE INVENTION

1. Field of the Invention

The invention relates to a clocked memory cell.

2. Description of Prior Art

Two patents are pertinent — U. S. Pat. No. 3,591,836 for "A Field Effect Conditionally Switched Capacitor" issued to Robert K. Booher et al., on July 6, 1971 and U. S. Pat. No. 3,582,909 for "A Ratioless Memory Circuit Using Conditionally Switched Capacitor" issued to Robert K. Booher on June 1, 1971. The '836 patent describes a field effect capacitive storage element of the type described and shown herein. The '909 patent teaches one example of a memory cell using the field effect capacitive storage element. The '909 cell uses three clock signals, including read, write and address signals. Three field effect transistors are required for each cell exclusive of the address field effect transistor. No fixed voltages are used.

SUMMARY OF THE INVENTION

Briefly the invention comprises a memory cell which includes a capacitive storage means connected to a first clock signal for providing a boost (increased) signal at a pre-output node of the cell as a function of the logic state of data stored in the cell. The boost signal occurs during reset and read intervals and enables a read field effect transistor to be completely turned on for applying a fixed voltage level on one of its electrodes across capacitor at pre-output node of the cell without a threshold loss across the read transistor.

An address field effect transistor is connected between the pre-output node and a data line and is controlled by an address signal in combination with either read or write clock signals.

The capacitive storage means is charged through a write field effect transistor, connected between the pre-output node and the storage means, to one of two voltage levels representing first or second logic states of data written into the memory cell. For one logic state, the first clock signal is boosted to completely turn on the read transistor for charging the pre-output node, while for the second logic state no boost occurs. The write field effect transistor has its gate electrode connected to a fixed voltage level. To completely turn-off the write transistor prior to the read interval, the boost signal is initially applied to the storage means during the preceding reset interval to drive the pre-output node to a voltage insuring turn-off of the write transistor prior to turn-on of the address transistor and connection of the pre-output node to the data line. As a result, the boosted signal on the storage means is not dissipated and lost through the write ransistor. The read and address field effect transistor have relative impedances to prevent loss of the boost signal during the read interval when the data line is being charged. Therefore a maximum (relatively high) output signal representing the stored data is provided at the data line. The data line was reset to a false logic state during the reset interval. In addition, the capacitor at the pre-output node also provides a regenerative charge to replace charge leakage from the capacitive storage means when the cell is not addressed.

Therefore it is an object of this invention to provide an improved memory cell using a boost clock signal to provide a relative high output voltage level representing the logic state of stored data as a function of the logic state of the stored data.

It is another object of this invention to provide a two clock memory cell which uses fixed voltage levels to replace other clock signals.

Still another object of this invention is to provide a two-clock memory cell enabling a relatively smaller memory cell to be fabricated.

A still further object of this invention is to provide a two-clock memory cell in which a pre-output node is precharged to prevent loss of storage charge during the read interval of an addressed memory cell.

Another object of this invention is to provide a two-clock memory cell in which the relative conduction of a read field effect transistor and an address field effect transistor is controlled to reduce storage charge loss during the read interval of an addressed memory cell.

These and other objects of the invention will become more apparent when taken in connection with the description of the drawings, a brief description of which follows:

DESCRIPTION OF THE PREFERRED EMBODIMENT

Figures 1, 2:
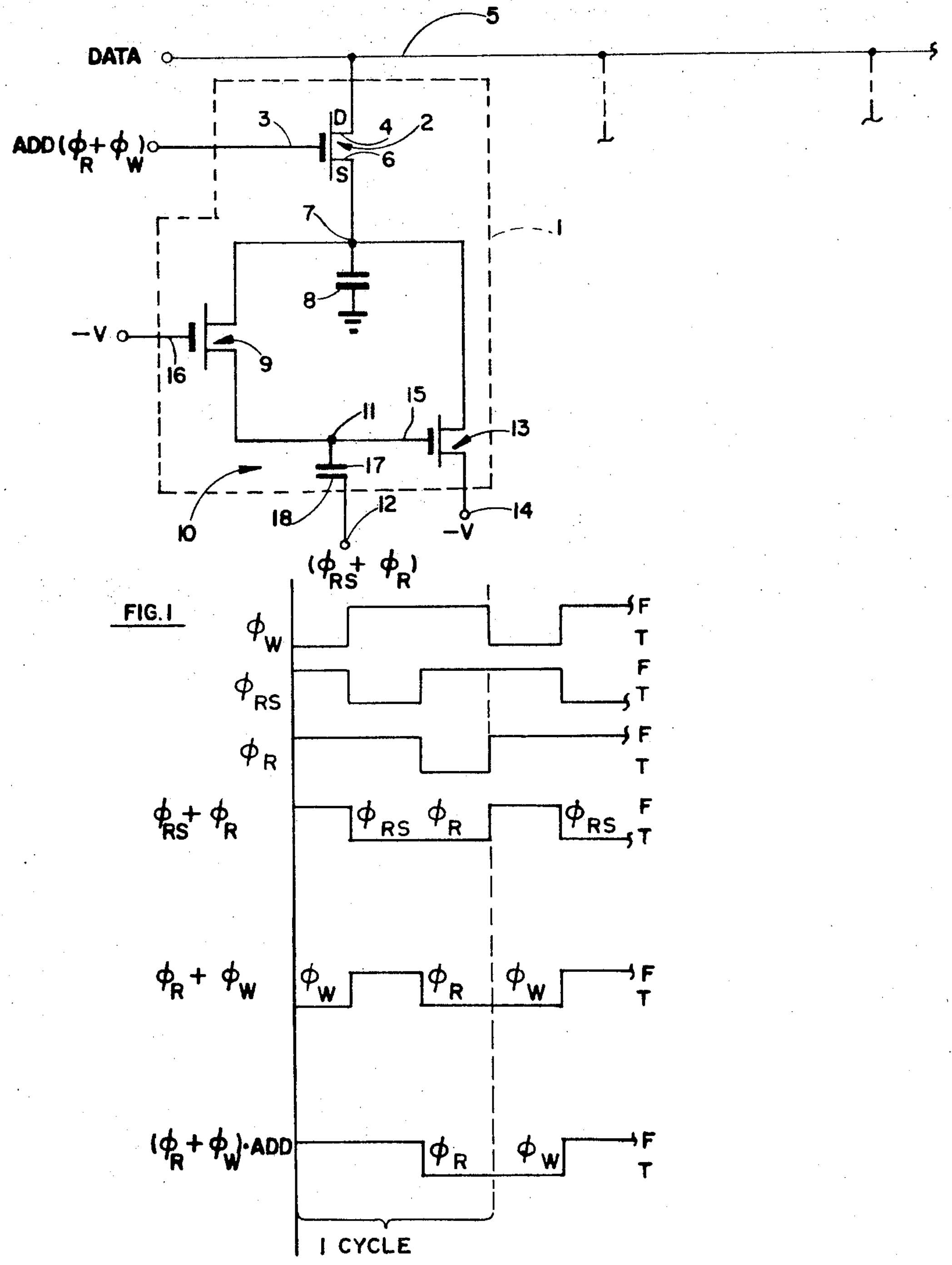
FIG. 1 is a schematic diagram of one memory cell connected to a data line.
FIG. 2 is a signal diagram of the clock signals used by the FIG. 1 memory cell.

FIG. 1 illustrates memory cell 1 comprising an address field effect transistor 2 having its gate electrode 3 connected to a first clock signal. The first clock signal is formed by ANDing an address interval ADDC which occurs whenever the memory cell 1 is addressed for writing data into the cell or for reading data from the cell, with the OR function of a read interval $\phi_R$ and a write interval $\phi_w$. The read and write clock signals and their OR'ed combination are illustrated in FIG. 2, the signals being true (logical one) when they are negative. The drain electrode 4 of the field effect transistor is connected to the data line 5 which is periodically reset to electrical ground representing a logic zero (false). The source electrode 6 of field effect transistor 2 is connected to pre-output node 7 of the memory cell. Capacitor 8 is connected between the pre-output node and electrical ground. Capacitor 8 is used for storage charge regeneration and as described subsequently, to prevent storage charge loss at the beginning of a read interval when the cell is addressed.

Write field effect transistor 9 is connected between the pre-output node and field effect transistor capacitive storage device 10. The gate electrode of the write field effect transistor is connected to a fixed voltage level, −V. The control electrode of a capacitive storage device 10 is connected to a second clock signal comprising the ORed combination of a reset $\phi_{RS}$ interval and the read interval $\phi_R$. The reset and read clock, and FIG. 2 illustrates the case in which ADD is true during the read interval of the first cycle of the clock sequence and is true during the write interval signals and their OR'ed combination are illustrated in FIG. 2. As can be seen from FIG. 2, the ORed combination of the $\phi_R$ + $\phi_W$ clock signal has a true interval (negative voltage level) which overlaps the true interval of the ORed combination of the $\phi_{RS}$ + $\phi_R$ clock signal during the read interval. The address signal may become true during either or both the read and write intervals, and FIG. 2 illustrates the case in which ADD is true during the read interval of the first cycle of the clock sequence and is true during the write interval in the second cycle.

The field effect capacitive storage element 10 is connected between node 11 and terminal 12 for the second clock signal.

Read field effect transistor 13 is connected between the pre-output node 7 and terminal 14 for the fixed voltage level –V. The gate electrode 15 of the read field effect transistor is connected to node 11. The gate electrode of the read field effect transistor is therefore controlled by the voltage level stored by the field effect capacitive device 10.

Figure 3:
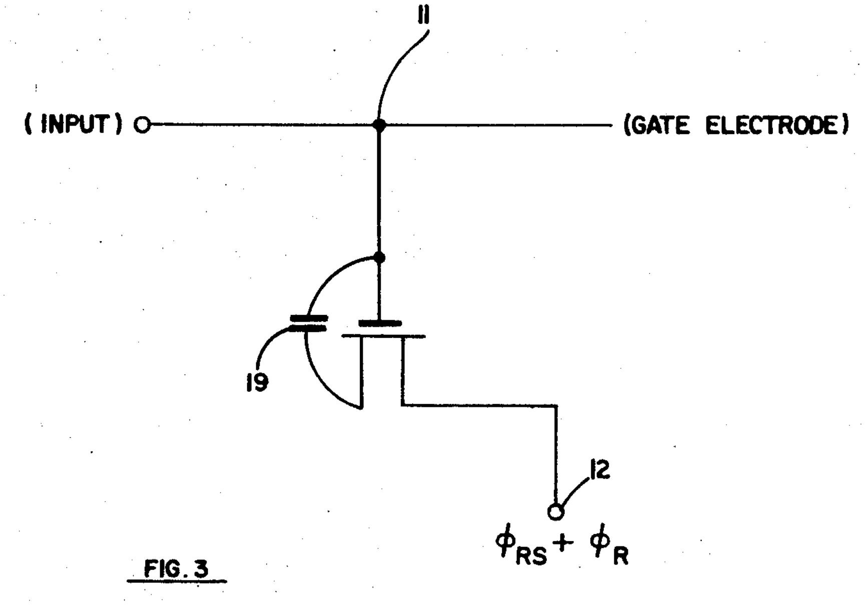
FIG. 3 shows an alternate capacitive storage element.

As described more completely in the previously referenced patents, the field effect capacitive storage device 10 comprises a conducting metal layer disposed on a relatively thin insulating layer over a semiconductive substrate. A control electrode is connected directly to the semiconductive substrate in relative proximity to the substrate portion underlying the metal layer. As a result, when a voltage in excess of the threshold votage level for the substrate material is applied to the metal layer, the substrate surface under the metal layer undergoes an inversion for forming a second plate of a capacitor. Charge is stored therefore between the metal layer serving as one plate of the capacitor and the inversion layer serving as a second plate of the capacitor. The field effect capacitive storage element is also formed with a diffused region under the control electrode. When a voltage is applied to the metal layer, such that the inversion occurs, the inversion layer is electrically connected to the diffused region under the control electrode. Therefore, when a voltage level is applied to the control electrode, the voltage level on the metal layer of the capacitive device is immediately boosted, or increased as a function of the voltage level on the control electrode. In other words, when a voltage is being stored by the capacitive device, a boost signal can be generated by applying a signal to the control electrode. If a voltage is not being stored, no boost occurs. An alternate version of the capacitive storage device is shown in FIG. 3. This version uses a bootstrapped boost capacitor instead of the capacitive storage device. The capacitor 19 is connected between the source and gate electrodes of field effect transistor 20. The equivalent circuit points 11 and 12 are labeled to show the connection of the device in the FIG. 1 circuit. Operation of this device is identical to the capacitive storage device.

In prior art memory cells, the write field effect transistor would normally have its gate electrode 16 connected to a write clock signal. The circuit of the present invention results in a smaller cell layout and eliminates the necessity for creating a special write clock. In addition, the fixed voltage level of the present circuit on terminal 14 of the read field effect transistor would normally have been a read clock signal. As a result, in prior memory cells the read clock signal was required to supply a relatively large amount of current during a readout period. It has also been found more desirable herein to utilize a fixed voltage level on the gate electrode of the write field effect transistor because of increased advantages derived when laying out the memory cell. In addition, an address field effect transistor has been normally controlled by an address signal in prior cells inasmuch as the read and write field effect transistors are separately controlled by read and write clock signals. However, since the read and write field effect transistors employed in the present circuit are not controlled by read and write clock signals as in prior art memory cells, the clock signal which is applied to the gate electrode of the address field effect transistor comprises the combination of intervals previously described.

It is also pointed out for layout purposes the –V terminals can be used as an a.c. ground for the capacitor 8 connected between pre-output node 7 and electrical ground.

In operation, during the $\phi_W$ (write) interval, a logic 1 may be written into the memory cell from the data line 5 through field effect transistors 2 and 9, both of which are on when the memory cell 1 is addressed during the write interval. Address transistor 2 is turned on by application of the AND'ed address and write signals, ADD and $\phi_W$, respectively. Write transistor 9 is rendered ready for conduction by –V at its gate electrode 16. Assuming that –V is approximately –25 volts, a voltage of approximately –18 volts is applied to node 11 of the capacitive storage device 10. A threshold voltage drop across the address field effect transistor 2 of approximately 7 volts is assumed. No further threshold loss is incured across field effect transistor 9 since its gate is at –25V. After the write interval, field effect transistor 2 is turned off and the –18 volts remains at node 11. In addition, capacitor 8 is also charged to approximately –18 volts.

Since the voltage at node 11 is relatively higher than the threshold voltage level of the field effect capacitive storage element 10, an inversion takes place under the fixed plate 17 of the device so that a charge proportional to the voltage level and capacitance of storage element 10 is stored between the fixed plate 17 and the inversion layer 18.

During the reset interval, $\phi_{RS}$, a negative voltage level of –25 volts is applied to terminal 12 of the capacitive storage element. As a result, the voltage at node 11 becomes more negative as a function of the negative voltage level of the $\phi_{RS}+\phi_R$ clock signal. The write field effect transistor 9 is immediately cutoff since the voltage level at pre-output node 7 is already one threshold below the voltage on the gate electrode 16 of field effect transistor 9. Assuming that a voltage level of approximately –18 volts is stored on node 11 initially, and further assuming a clock signal voltage level of approximately –25 volts, the voltage at node 11 is boosted to approximately –36 volts. This boosted voltage value is less than the sum of the stored voltage and clock voltage at node 11 due to the inherent stray capacitance at the node. The read field effect transistor 13 is turned on which precharges the pre-output node 7 to the –V voltage level, assumed to be –25 volts for purposes of this description thereby insuring complete turn-off of the write field effect transistor 9 to prevent dissipation and loss of the boosted signal at node 11 through the write transistor. Without the boost signal, the –25 volts would be reduced by the threshold drop across the read field effect transistor to approximately –12 volts since its gate is storing a voltage level of approximately –18 volts.

Since the address field effect transistor 2 is off during the reset interval, the memory cell is isolated from the data line 5 which is reset to a false logic state, electrical ground, during the reset interval. During the read interval, assuming the cell is addressed, field effect transistor 2 is turned on and the −25 volts on capacitor 8, reduced by a threshold voltage level across the address field effect transistor 2, is applied to data line 5. As a result, the inherent capacitance on data line 5 begins to charge to approximately −18 volts. The voltage at the pre-output node 7 decreases from approximately −25 towards −18 volts during the period that the data line is being charged since the read and address field effect transistors have a series impedance. The actual level is determined by the impedance ratios of the read and address field effect transistors and the rise time of the address control signal applied to the gate of field effect transistor 2. In other words, the read and address field effect transistors provide the R of the RC charge time constant.

If the voltage at pre-output node 7 had become more positive such that it was less in magnitude than −18 volts, field effect transistor 9 would have turned on and the charge at node 11 would have been discharged until an equilibrium voltage level existed at node 7 and 11. If the voltage at node 11 changed, the boost signal on the gate electrode 15 of field effect transistor 13 would have also changed. If the change in the voltage at node 11 had been substantial, the boost effects of the first clock signal ($\phi_{RS}+\phi_R$) would have been lost.

In order to prevent the voltage at node 7 from becoming more positive than one threshold below −V, read field effect transistor 13 can be made slightly larger than address field effect transistor 2. In other words, the impedance of the read field effect transistor is small relative to the impedance of the address field effect transistor so that substantially all of the voltage, −V, is dropped across field effect transistor 2 and a relatively small drop occurs across field effect transistor 13. In addition, the relative conduction of the address and read field effect transistors can be controlled by providing an address signal with a relatively long rise time. As a result, the adress field effect transistor acts as a follower so that a relatively small amount of drop occurs at node 7. The total capacitive load on the data line 5 in conjunction with the conduction sizes of field effect transistors 2 and 13 and the rise time of the address signal will determine the upper speed limit at which the cell can be used. An example of typical dimensions (in nils) for the P-region channels of the address, read, and write field effect transistors is shown in the following table. For the dimensions shown in Table 1 rise times of no faster than 0.2 $\mu$-sec are required for the address signal.

TABLE I

| Field Effect Transistor | Length of P-region | Width of P-region |
|---|---|---|
| address | 0.4 | 0.4 |
| write | 0.4 | 0.2 |
| read | 0.4 | 0.7 |

It should be pointed out that relatively high voltage P—channel field effect transistors are used as examples in describing the preferred embodiment. As a result, negative voltage levels are used to turn the devices on and to represent a true or logic 1 state. Electrical ground voltage levels, zero volts, are used to represent a false, or logic zero state. In other embodiments, N-channel devices, CMOS, silicon gate devices having a relatively low threshold voltage level, and other field effect devices can be used to implement an embodiment of the memory cell. In other embodiments, the voltage levels and/or the logic convention may be changed as required for the particular embodiment.

If a logic zero is written into the memory cell, the voltage at nodes 7 and 11 is zero. Therefore, during the reset interval, no boost signal is provided to the gate electrode 15 of the read field effect transistor 13. Therefore, the read field effect transistor is not turned on and the −V voltage level is not applied to pre-output node 7. During the read interval if the memory cell is addressed, since the pre-output node 7 is at electrical ground, no output occurs.

It is also pointed out that if the voltage at node 11 leaks due to diode leakage of the P-region of field effect transistor 9 connected to node 11, the charge at the pre-output node 7 (when a logic 1 is stored) is used to replace the lost charge from node 11 since it is approximately one threshold more negative than the voltage at node 11. The degree to which the charge at node 7 is used to replace lost charge from node 11 depends upon the relative size of capacitor 8 and field effect capacitive device 10. When the cell is not addressed the logic one which is stored in the cell is regenerated by this process. Each clock time node 7 is charged to −25 volts which replenishes any charge lost on node 11 as soon as the ORed combination of the reset and read clock connected to boost capacitor 10 returns to ground.

I claim:

1. A memory cell having write, reset, and read intervals and comprising:

capacitive storage means for storing voltage levels representing first and second logic states of data stored in said memory cell, means for applying a first clock signal to said capacitive storage means during said reset and read intervals of said memory cell, for providing a boost signal at said capacitive storage means during said reset and read intervals for only one of said first and second logic states, a read field effect transistor connected to respond to said boost signal for providing a relatively increased voltage level output for said one logic state.

2. The memory cell recited in claim 1 further including a write field effect transistor connected between a circuit node and said capacitive storage means for applying said voltage levels to said capacitive storage means during said write interval, said write field effect transistor having its gate electrode connected to a fixed voltage.

3. The memory cell recited in claim 2 wherein said read field effect transistor has one electrode connected to a fixed voltage level and another electrode connected to said circuit node, said fixed voltage level being applied to said circuit node without a threshold loss across said read field effect transistor in response to said boost signal, and capacitance means at said circuit node for being charged by voltage levels thereat.

4. The memory cell recited in claim 3 further including an address field effect transistor connected between said circuit node and a data line on which voltages representing data are written into and read from said memory cell, said data line being reset to a reference logic state during a reset interval prior to a read interval, said address field effect transistor having its gate electrode connected to a second clock signal having OR'ed read and write intervals AND'ed with an address interval.

5. The memory cell recited in claim 4 wherein said read and address field effect transistors have relative impedances for preventing a substantial change in the voltage level at said circuit node when stored data is read from said memory cell, and said capacitance means provides a regenerative charge to replace charge leakage from said capacitive storage means, whereby one of said logic states stored in said cell is regenerated when said cell is not addressed.

6. The memory cell recited in claim 5 wherein the impedance of said read field effect transistor is small relative to that of said address field effect transistor.

7. A memory cell comprising, a field effect capacitive storage device having a fixed plate connected to a storage node and a control electrode connected to a first clock signal including a reset and read interval for providing a boosted signal at said storage node as a function of the logic state of data stored in said cell, a read field effect transistor connected between a fixed voltage level and a pre-output node of said memory cell, said read field effect transistor having its gate electrode connected to said storage node for enabling the conduction of said read field effect transistor to be controlled by the boosted signal at said storage node, and a write field effect transistor connected between said pre-output node and said storage node, said write field effect transistor having its gate electrode connected to a fixed voltage level for enabling said write field effect transistor to conduct during a write interval.

8. The memory cell recited in claim 7 further including an address field effect transistor connected between said pre-output node and a data line on which voltage levels representing data are written into and read from said memory cell during read and write intervals, said data line being reset to a reference logic state during a reset interval of said memory cell, said address field effect transistor having its gate electrode connected to a second clock signal having an address interval and the logically ORed combination of read and write intervals.

9. The memory cell recited in claim 8 and further including, a capacitor connected at said pre-output node, said address and read field effect transistors have relative sizes for preventing a substantial change in the voltage level across said capacitor at said pre-output node during a read interval when the cell is addressed, and said capacitor further providing a regenerative charge to replace charge leakage from said storage device to regenerate a stored logic state when said cell is not addressed.

10. A memory cell comprising, a storage capacitor connected to a storage node and further disposed in bootstrapped connection between gate and output electrodes of a field effect transistor having input, output, and gate electrodes with said gate electrode connected to said storage node and said input electrode connected to a first clock signal including a reset and read interval for providing a boosted signal at said storage node as a function of the logic state of data stored in said cell, a read field effect transistor connected between a fixed voltage level and a pre-output node of said memory cell, said read field effect transistor having its gate electrode connected to said storage node for enabling the conduction of said read field effect transistor to be controlled by the boosted signal at said storage node, and a write field effect transistor connected between said pre-output node and storage node, said write field effect transistor having its gate electrode connected to a fixed voltage level for enabling said write field effect transistor to conduct during a write interval.

11. The memory cell recited in claim 10 further including an address field effect transistor connected between said pre-output node and a data line on which voltage levels representing data are written into and read from said memory cell during read and write intervals, said data line being reset to a reference logic state during a reset interval of said memory cell, said address field effect transistor having its gate electrode connected to a second clock signal having an address interval and the logically OR'ed combination of read and write intervals.

12. The memory cell recited in claim 11 and further including, a capacitor connected at said pre-output node, said address and read field effect transistors have relative sizes for preventing a substantial change in the voltage level across said capacitor at said pre-output node during a read interval when the cell is addressed, and said capacitor further providing a regenerative charge to replace charge leakage from said storage device to regenerate a stored logic state when said cell is not addressed.

13. A memory cell comprising storage means, means for charging the storage means to either one of two levels during a first time interval, means for applying a first clock signal to the storage means during second and third time intervals, thereby to provide, for one but not the other of said levels, a boosted signal at the storage means, and means connected to the storage means so as to be rendered conductive by the boosted signal, and when rendered conductive to provide an enhanced voltage level output during the second and third time intervals.

14. The memory cell recited in claim 13 wherein said means for charging includes a first field effect transistor connected between a circuit node and said storage means and having a gate electrode connected to a first fixed voltage for enabling charging of said storage means through said first field effect transistor, and said means connected to the storage means so as to be rendered conductive by the boosted signal includes a second field effect transistor through which a second fixed voltage is connected to said circuit node, whereupon said second fixed voltage is connected to said circuit node without a threshold loss through said second field effect transistor during said second interval thereby insuring the turn-off of said first field effect transistor prior to said third interval.

15. The memory cell recited in claim 14 including, a third field effect transistor connected between said circuit node and a data line from which data is written into said cell during said first interval and read from said cell during said third interval, said third field effect transistor having a second clock signal applied to its gate electrode during said first and third intervals, when said cell is addressed, whereby data is written into said cell through said first and third field effect transistors during said first time interval and read therefrom through said second and third field effect transistors during said third time interval.

16. The memory cell recited in claim 15, wherein the impedance of said second field effect transistor is relatively smaller than that of said third field effect transistor to prevent a substantial change in the voltage at said circuit node during said third interval thereby maintaining said first field effect transistor off to prevent dissipation and loss of said boosted signal through said first field effect transistor.

17. The memory cell recited in claim 13, wherein said storage means includes a conditionally switched capacitor having a control electrode receiving said first clock signal.

18. The memory cell recited in claim 13, wherein said storage means includes a bootstrapped capacitor connected between the gate and output electrodes of a field effect transistor, the first clock signal being applied to the input electrode of said field effect transistor.

19. In combination:

a circuit line;

a circuit node;

a storage node;

a first field effect transistor connected in a path between the circuit line and the ciruict node;

a second field effect transistor connected in a path between the circuit node and the storage node and having a gate electrode connected to receive a fixed voltage level;

a third field effect transistor connected in a path between the circuit node and a voltage source and having a gate electrode connected to receive signals from the storage node;

first clock means for rendering the first transistor conductive during a first interval to provide an input charge path from the circuit line through the first and second transistors to the storage node for storing a first or second voltage level at the storage node;

second clock means for providing a boosted voltage level at the storage node for only one of said first or second stored voltage levels, with the boosted voltage level being sufficient to render the third transistor conductive to connect the voltage source to the circuit node, thereby providing a voltage at the circuit node adequate to insure turn-off of the second transistor, to prevent dissipation and loss of the boosted voltage level through the second transistor; and the first clock means rendering the first transistor conductive after turn-off of the second transistor to provide an output path through the third and first transistors to the circuit line, whereby an output signal is derived at the circuit line representing the stored one of the first or second stored voltage levels.

20. The combination recited in claim 19 wherein:

the said voltage source connected through the third transistor supplies a fixed voltage level to the circuit node without a threshold loss across the third transistor.

21. The combination recited in Claim 19 wherein:

the first and third transistors have relative impedances for preventing a substantial change in the voltage at the circuit node during conduction of the third and first transistors thereby holding the second transistor off to prevent loss of the boosted voltage level at the storage node.

22. The combination recited in claim 19 including, a conditionally switched capacitive storage means having one electrode connected to the storage node and a control electrode connected to the second clock means.

23. The combination recited in claim 19 including, a fourth field effect transistor having input, output, and gate electrodes with its gate electrode connected to the storage node, a bootstrapped capacitor connected between its gate and output electrodes, and the input electrode connected to receive the second clock means.

24. In combination:

a circuit node;

a storage node;

a field effect transistor connected in a first path between the circuit node and the storage node and having a gate electrode connected to receive a fixed voltage level for rendering the transistor conductive during a first interval to provide a charge path for charging the storage node to a prescribed voltage level;

clock means for providing a boosted voltage level at the storage node when the prescribed voltage level is present;

means in a second path between a voltage source and the circuit node and having means connected to respond to the boosted voltage level to supply a circuit node voltage to the circuit node from the voltage source, the level of said circuit node voltage being sufficient to render the field effect transistor non-conductive to thereby prevent dissipation and loss of the boosted signal along the first circuit path through the transistor.

25. The combination recited in claim 24 including, means connected in an output path from the circuit node to be rendered conductive by clock signal means applied thereto, the clock signal means being applied after the field effect transistor has been rendered non-conductive.

26. The combination of claim 24 wherein the storage means is charged to first or second prescribed voltage levels and the clock means provides a boosted voltage level for only one of the first or second prescribed voltage levels.

* * * * *

UNITED STATES PATENT OFFICE
CERTIFICATE OF CORRECTION

Patent No. 3,744,037 Dated July 3, 1973

Inventor(s) John R. Spence

It is certified that error appears in the above-identified patent and that said Letters Patent are hereby corrected as shown below:

Attorney, change "Royers" to --Rogers--.

Column 1, line 31, change "capacitor at pre-output" to --a capacitor at a pre-output--.

line 54, change "ransistor" to --transistor--.

line 55, change "transistor" to --transistors--.

Column 2, line 35, change "ADDC which" to --ADD (which--.

line 38, change "cell," to --cell),--.

lines 59-63, delete ", and Fig. 2...write intervals"

Signed and sealed this 6th day of August 1974.

(SEAL)
Attest:

McCOY M. GIBSON, JR.
Attesting Officer

C. MARSHALL DANN
Commissioner of Patents